United States Patent
Ozaki et al.

(10) Patent No.: US 9,302,727 B2
(45) Date of Patent: Apr. 5, 2016

(54) INVERTED PENDULUM CONTROL TYPE MOVING BODY

(71) Applicant: HONDA MOTOR CO., LTD., Minato-ku, Tokyo (JP)

(72) Inventors: Kazumasa Ozaki, Wako (JP); Hiroshi Iwakami, Wako (JP); Shinji Kawatani, Wako (JP); Hideo Murakami, Wako (JP); Shinya Shirokura, Wako (JP); Atsushi Matsunaga, Wako (JP); Tomokazu Sakamoto, Wako (JP); Makoto Hasegawa, Wako (JP); Shinichiro Kobashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 43 days.

(21) Appl. No.: 14/534,828

(22) Filed: Nov. 6, 2014

(65) Prior Publication Data
US 2015/0129326 A1 May 14, 2015

(30) Foreign Application Priority Data
Nov. 11, 2013 (JP) ................. 2013-233101

(51) Int. Cl.
*B62D 61/00* (2006.01)
*B62K 3/00* (2006.01)
*B62H 1/02* (2006.01)
*B62K 1/00* (2006.01)
*B62J 25/00* (2006.01)

(52) U.S. Cl.
CPC *B62K 3/007* (2013.01); *B62H 1/02* (2013.01); *B62J 25/00* (2013.01); *B62K 1/00* (2013.01); *Y10T 74/20918* (2015.01)

(58) Field of Classification Search
CPC ............ B62H 1/02; B62K 3/007; B62K 1/00; B62J 25/00; Y10T 74/20918
USPC ........................................ 180/21, 2, 208, 218
See application file for complete search history.

(56) References Cited

U.S. PATENT DOCUMENTS

| 8,225,891 B2 * | 7/2012 | Takenaka ............... B62K 3/007 180/7.1 |
| 8,776,934 B2 * | 7/2014 | Muto ...................... B62K 3/007 180/21 |
| 9,061,721 B2 * | 6/2015 | Muto ...................... B62K 3/007 |

FOREIGN PATENT DOCUMENTS

JP 2011-063243 A1 3/2011
JP 5062328 B2 10/2012

* cited by examiner

*Primary Examiner* — Kevin Hurley
*Assistant Examiner* — Marlon Arce
(74) *Attorney, Agent, or Firm* — Carrier Blackman & Associates, P.C.; Joseph P. Carrier; William D. Blackman

(57) ABSTRACT

An inverted pendulum control type moving body is provided with: a first driving portion that moves a host moving body at least in a forward/backward direction; a supporting portion that supports the inverted pendulum control type moving body so that it stands independently in a state of being in contact with the ground; an operation portion that switches between the ground contact state and a ground separation state of the supporting portion; and a control portion that, when the operation portion switches the state of the supporting portion from the ground contact state to the ground separation state, controls operation of the first driving portion so that a forward/backward direction tilt angle of the inverted pendulum control type moving body approximates a target tilt angle in the ground contact state.

11 Claims, 11 Drawing Sheets

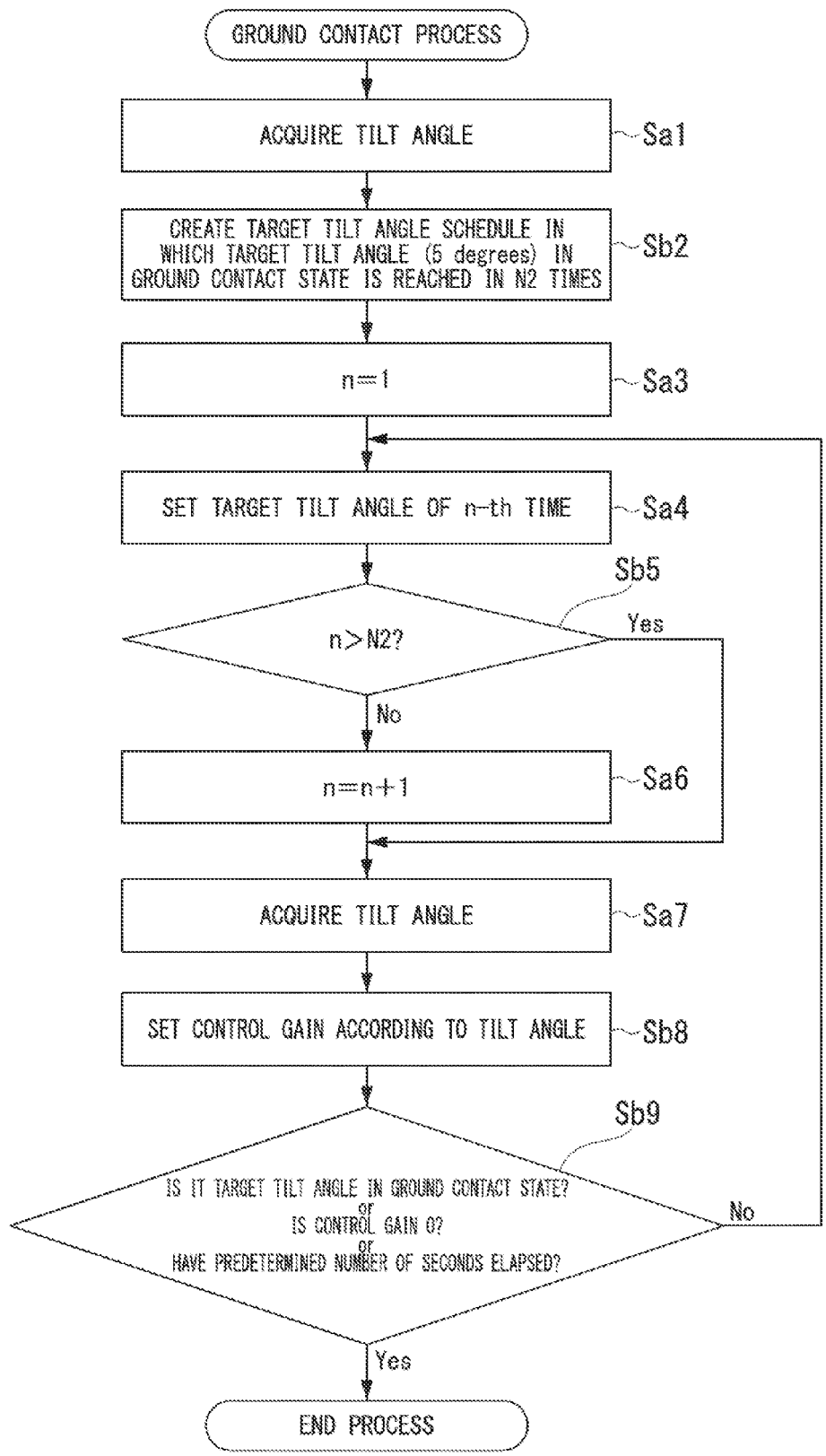

INVERTED PENDULUM CONTROL TYPE MOVING BODY

CROSS-REFERENCE TO RELATED APPLICATIONS

Priority is claimed on Japanese Patent Application No. 2013-233101, filed Nov. 11, 2013, the contents of which are incorporated herein by reference.

BACKGROUND OF THE INVENTION

1. Field of the Invention

The present invention relates to an inverted pendulum control type moving body.

2. Description of Related Art

Heretofore, there has been an inverted pendulum control type moving body that is controlled so that it independently stands without support when operating. Moreover, there is an inverted pendulum control type moving body that is provided with a stand in order to prevent falling in the operation stop state where self-supporting control is stopped (for example, refer to Japanese Unexamined Patent Application, First Publication No. 2011-63243, and Japanese Patent No. 5062328).

SUMMARY OF THE INVENTION

However, there is a problem with the inverted pendulum control type moving body in that the forward/backward direction tilt angle suitable for getting on and off the vehicle differs from the tilt angle at the time of operating where the passenger feels stability. Therefore the passenger feels instability when getting on and off the vehicle.

Aspects of the present invention takes into consideration the above circumstances, with an object of providing an inverted pendulum control type moving body capable of allowing a passenger to get on and off the vehicle while they are feeling stability.

The present invention employs the following measures in order to solve the above problems and achieve the object.

(1) An inverted pendulum control type moving body according to an aspect of the present invention is provided with: a first driving portion that moves a host moving body on a movement plane at least in a forward/backward direction; a supporting portion that supports the host moving body so that it stands independently in a state of being in contact with the ground; an operation portion that switches between the ground contact state and a ground separation state of the supporting portion; and a control portion that, when the operation portion switches the state of the supporting portion from the ground contact state to the ground separation state, controls operation of the first driving portion so that a forward/backward direction tilt angle of the host moving body approximates a target tilt angle in the ground separation state.

(2) An inverted pendulum control type moving body according to another aspect of the present invention is provided with: a first driving portion that moves a host moving body on a movement plane at least in a forward/backward direction; a supporting portion that supports the host moving body so that it stands independently in a state of being in contact with the ground; an operation portion that switches between the ground contact state and a ground separation state of the supporting portion; and a control portion that, when the operation portion switches the state of the supporting portion from the ground separation state to the ground contact state, controls operation of the first driving portion so that a forward/backward direction tilt angle of the host moving body approximates a target tilt angle in the ground contact state.

(3) In the aspect of either one of (1) and (2) above, the supporting portion may function as a step on which a foot of a passenger of the host moving body is placed in the ground separation state.

(4) In the aspect of any one of (1) through (3) above, the operation portion may be mechanically connected to the supporting portion.

(5) In the aspect of (3) above, an angle with respect to a horizontal plane, of a plane of the step on which a foot is placed may be greater when the supporting portion is in the ground contact state than that when the supporting portion is in the ground separation state.

(6) In the aspect of (1) above, the control portion may control the first driving portion so that the host moving body stands independently at a predetermined tilt angle, and when the operation portion switches the state of the supporting portion from the ground contact state to the ground separation state, it may change the predetermined tilt angle to a rear side compared to a tilt angle in a time when the host moving body is being supported by the supporting portion and standing independently.

(7) In the aspect of (2) above, the control portion may control the first driving portion so that the host moving body stands independently at a predetermined tilt angle, and when the operation portion switches the state of the supporting portion from the ground separation state to the ground contact state, it may change the predetermined tilt angle so as to approach a tilt angle in a time when the host moving body is being supported by the supporting portion and standing independently, and may lower feedback gain at the time of controlling the first driving portion so that the host moving body stands independently at the predetermined tilt angle.

(8) In the aspect of any one of (1) through (7) above, there may be provided: a frame portion which rotatably supports the first driving portion; a second driving portion which is attached so as to be able to rotate about a rotation center of the first driving portion via a link portion; a first restriction portion which restricts rotation of the link portion in a first direction about the rotation center; and a second restriction portion which restricts rotation of the link portion in a second direction about the rotation center. The operation portion may operate: a first operation which brings the supporting portion into the ground separation state and which at the same time increases a clearance between the first restriction portion and the second restriction portion, and a second operation which brings the supporting portion into the ground contact state and which at the same time reduces the clearance between the first restriction portion and the second restriction portion.

According to the aspect of (1) above, when the ground contact state is switched to the ground separation state by the operation portion, the tilt angle changes to the rear side compared to the case where the host moving body is being supported by the supporting portion and standing independently. Thereby, the passenger can change the tilt angle to the rear side while in a stable attitude where at least one foot or preferably both feet are placed on the movement plane, and as a result, the passenger can, while feeling stability, get on the vehicle and shift the tilt angle to a tilt angle that is suitable for traveling.

According to the aspect of (2) above, when the ground separation state is switched to the ground contact state by the operation portion, the tilt angle approaches to the angle at the time of being supported by the supporting portion and standing independently. Thereby, the passenger can, while in a stable attitude where at least one foot or preferably both feet are placed on the movement plane, bring the tilt angle to the approximate tilt angle at the time of being supported by the supporting portion and standing independently, and get off the vehicle. As result, the passenger can, while feeling stability, get off the vehicle.

In the case of (3) above, since the supporting portion functions as a step, an increase in the number of components can be prevented.

In the case of (4) above, since the supporting portion can be operated without using an electric motor or the like, an increase in the number of components can be prevented.

In the case of (5) above, in the ground contact state, the angle, with respect to the horizontal plane, of the plane on which a foot is placed becomes great and it becomes difficult to place a foot on this plane. Therefore, it is possible to prompt the passenger to place their foot on the movement plane.

In the case of (6) above, the first driving portion is controlled so as to change the tilt angle to the rear side when the ground contact state is switched to the ground separation state by the operation portion. Therefore, it is possible to eliminate the need for the passenger to change the tilt angle by themselves.

In the case of (7) above, when the ground separation state is switched to the ground contact state by the operation portion, the first driving portion is controlled so as to bring the tilt angle to the approximate tilt angle at the time of being supported by the supporting portion and standing independently, and feedback gain is lowered. As a result, it is possible to eliminate the need for the passenger to change the tilt angle by themselves, and it is possible to prevent the first driving portion from being driven with a large force when the passengers tries to bring the tilt angle to a tilt angle that differs from the tilt angle at the time of being supported by the supporting portion and standing independently.

In the case of (8) above, by means of the operation portion, it is possible to synchronously operate contact/non-contact of the supporting portion with the movement plane, and set the distance between the first restriction portion and the second restriction portion. As a result, it is possible to execute appropriate attitude control at the time of performing controls (at the time of executing the first operation) such as self-supporting control and traveling control, which allow a backward leaning attitude, while ensuring stable attitude maintenance in an uncontrolled state (at the time of executing the second operation) such as when stopping and/or getting on/off the moving body where backward leaning attitude is not allowed.

BRIEF DESCRIPTION OF THE DRAWINGS

FIGS. 3A-3C are diagrams schematically showing states of the operation portion of the inverted pendulum control type moving body according to the embodiment of the present invention, wherein FIG. 3A shows an initial state of the operation portion, FIG. 3B shows a neutral state of the operation portion, and FIG. 3C shows a locked state of the operation portion.

FIGS. 5A-5C are diagrams schematically showing states of a supporting portion of the inverted pendulum control type moving body according to the embodiment of the present invention, wherein FIG. 5A shows a state of the supporting portion at the time of performing self-supporting control and traveling control, FIG. 5B shows a stand-locked state of the supporting portion, and FIG. 5C shows an arm-locked state of the supporting portion.

FIGS. 7A-7C are diagrams schematically showing operating mode states of the supporting portion of the inverted pendulum control type moving body according to the embodiment of the present invention, wherein FIG. 7A shows a step mode state of the supporting portion, FIG. 7B shows a mode switching state of the supporting portion, and FIG. 7C shows a standard mode state of the supporting portion.

FIG. 10 is a flowchart for describing a ground contact process performed by the parameter setting portion 108 according to the embodiment of the present invention.

FIGS. 11A-11C are diagrams schematically showing operating mode states of the supporting portion of the inverted pendulum control type moving body according to a modified example of the embodiment of the present invention, wherein FIG. 11A shows a standard mode state of the supporting portion, FIG. 11B shows a mode switching state of the supporting portion, and FIG. 11C shows a step mode state of the supporting portion.

DETAILED DESCRIPTION OF THE INVENTION

Hereunder, an inverted pendulum control type moving body according to an embodiment of the present invention is described, with reference to the accompanying drawings.

Figure 1:
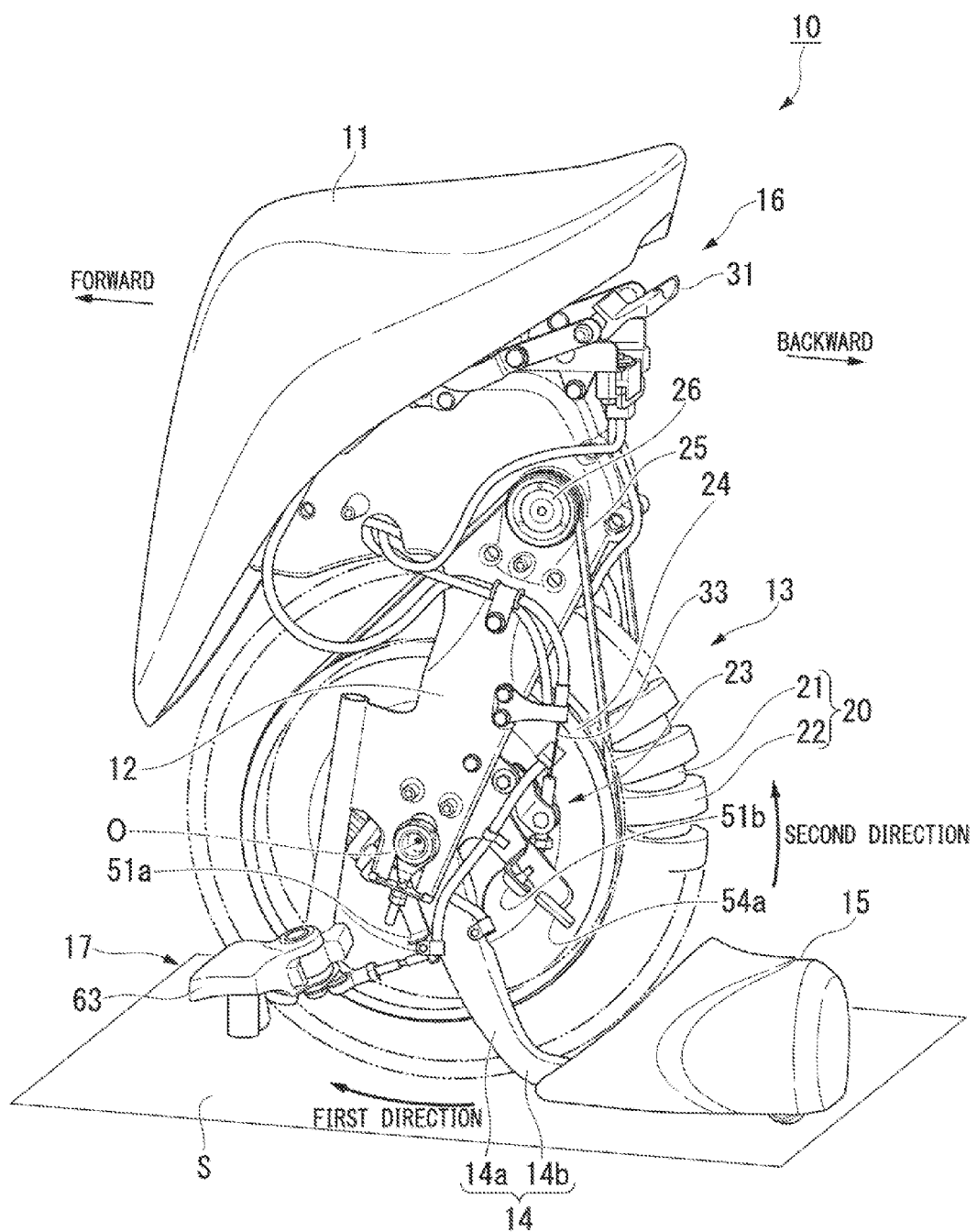
FIG. 1 is a perspective view schematically showing a configuration of an inverted pendulum control type moving body according to an embodiment of the present invention.
Figure 2:
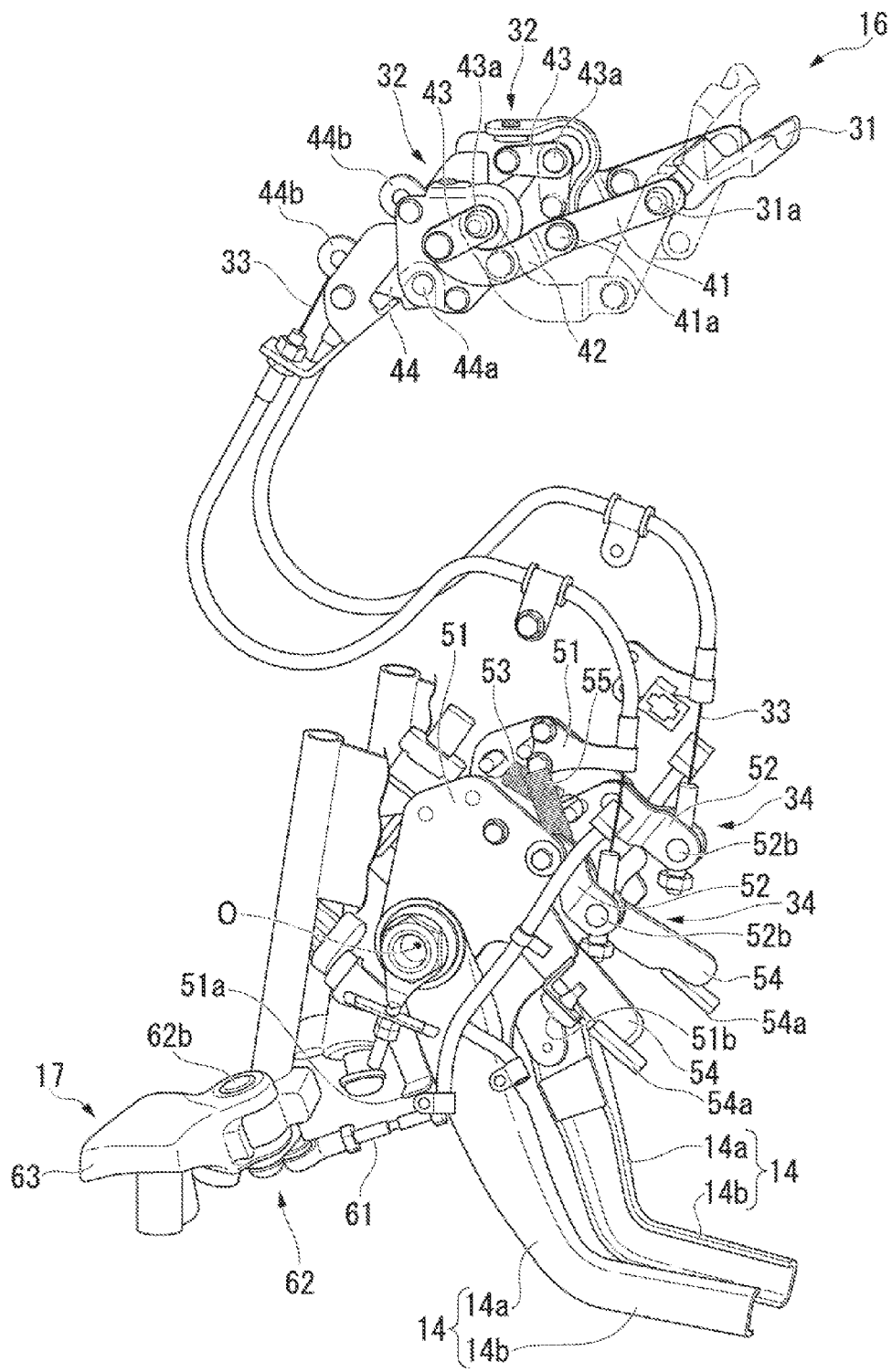
FIG. 2 is a perspective view schematically showing a mechanical mechanism connected to an operation portion of the inverted pendulum control type moving body according to the embodiment of the present invention.

As shown in FIG. 1, an inverted pendulum control type moving body 10 according to the present embodiment comprises: a seat portion 11 on which a passenger sits; a frame portion 12; a first driving portion 13 which is capable of driving in all directions on a movement plane S; a second driving portion 15 which is attached so as to be able to rotate via a link portion 14 about the rotation center of the first driving portion 13; an operation portion 16; and a supporting portion 17.

The seat portion 11 is fixed on the upper end portion of the frame portion 12. The seat portion 11 is formed so as to allow a passenger seated on the seat portion 11 to move the centroid in arbitrary directions such as the forward direction, backward direction, left direction, and right direction.

The first driving portion 13 is provided with a main wheel 20 which is supported by the frame portion 12 so as to be able to rotate at least in the first direction (backward rotation direction) and the second direction (forward rotation direction). The main wheel 20 is provided with a toric core body 21 which is of a torus body shape, and a plurality of toric rollers 22 which are attached on the core body 21 in a manner of being arranged at predetermined angular intervals along the circumferential direction of this core body 21 (that is, the direction about the rotation axis of the core body 21, being the circumferential direction of the major circumference of the torus body). The respective rollers 22 are attached on the core body 21 in a manner such that the inner circumferential surface of each roller 22 is arranged along the circumferential direction of the minor circumference of the torus body while the rotation axis of each roller 22 is facing the circumferential direction of the core body 21. Each roller 22 is able to rotate integrally with the core body 21 about the rotation axis O of the core body 21, and it is able to rotate about the center axis of the cross section of the core body 21 (that is, the circumferential axis with the rotation axis O of the core body 21 serving as the center thereof, being the circumference of the major circumference of the torus body).

As actuators for driving the main wheel 20, the first driving portion 13 is provided with left and right actuators 23 which are arranged so as to sandwich the outer circumferential surface of each roller 22 from both sides of the rotation axis O of the core body 21 (that is, from both sides in the left-right direction) at an inner side of the core body 21. Each of the left and right actuators 23 is connected to each of the output axes of left and right electric motors 26 via each of left and right pulleys 24 and each of belts 25. Thereby, the respective left and right actuators 23 drive the main wheel 20 by means of power transmitted respectively from the left and right electric motors 26.

To describe in more detail, the main wheel 20 is driven by the respective left and right actuators 23 in the state of being in contact with the movement plane S via the roller 22 positioned perpendicularly below the core body 21, while the rotation axis O of the core body 21 is parallel to the movement plane S.

For example, if the left and right electric motors 26 transmit rotation driving force of the same direction and the same speed respectively to the left and right actuators 23, each roller 22 makes rotational movement in the first direction (backward rotation direction) or the second direction (forward rotation direction) about the rotation axis O of the core body 21. As a result, the main wheel 20 and the core body 21 rotate in the first direction (backward rotation direction) or the second direction (forward rotation direction) about the rotation axis O of the core body 21. Accordingly, the inverted pendulum control type moving body 10 moves on the movement plane S in the backward direction or the forward direction of the inverted pendulum control type moving body 10 (that is, in the direction orthogonal to the rotation axis O of the core body 21. Further, in this case, each roller 22 does not rotate about the center axis of the cross section of the core body 21.

Moreover, for example, if the left and right electric motors 26 transmit rotation driving force of the opposite direction and the same speed respectively to the left and right actuators 23, each roller 22 rotates about the center axis of the cross section of the core body 21. As a result, the main wheel 20 and the core body 21 move in the direction of the rotation axis O of the core body 21 (that is, in the left direction or in the right direction). Accordingly, the inverted pendulum control type moving body 10 moves on the movement plane S in the left direction or the right direction of the inverted pendulum control type moving body 10. Moreover, in this case, the main wheel 20 and the core body 21 do not rotate about the rotation axis O of the core body 21.

Furthermore, for example, if the left and right electric motors 26 transmit rotation driving force in the same or opposite direction and at the different speeds respectively to the left and right actuators 23, each roller 22 makes rotational movement in the first direction (backward rotation direction) or the second direction (forward rotation direction) about the rotation axis O of the core body 21, and rotates about the center axis of the cross section of the core body 21. As a result, the main wheel 20 and the core body 21 move in the movement direction according to the difference in the rotational speed vector acting on the left and right actuators 23. Accordingly, the inverted pendulum control type moving body 10 moves on the movement plane S in the same direction as the movement direction of the main wheel 20.

The second driving portion 15 is connected to the left and right link portions 14 which are supported by the frame portion 12 so as to be able to rotate about the rotation center of the first driving portion 13. For example, each link portion 14 is provided with an arm portion 14a which extends backward and perpendicularly downward from the rotation center of the first driving portion 13, and a bend portion 14b which bends and extends from the arm portion 14a. This bend portion 14b is formed so as not to be in contact with the movement plane S when executing controls such as self-supporting control and traveling control of the inverted pendulum control type moving body 10, and so as to be able to come in contact with the movement plane S in the uncontrolled state such as when the inverted pendulum control type moving body 10 is stopping and/or the passenger is getting on/off.

The second driving portion 15 is provided with: a sub wheel (not shown in the figure) which is connected to the rear end portion of the bend portion 14b and which comes in contact with the movement plane S on the rear side of the main wheel 20 and can be driven in all directions on the movement plane S, and an electric motor (not shown in the figure) which drives the sub wheel.

As shown in FIG. 2 and FIG. 3A through FIG. 3C, the operation portion 16 is provided with: a lever 31 which is operated by the passenger seated on the seat portion 11; left and right cables 33 which are connected to the lever 31 via left and right link mechanisms 32; and left and right restriction mechanisms 34 which are connected respectively to the left and right link mechanisms 32 via the left and right cables 33.

The lever 31 is supported by the rotation shaft 31a fixed on the frame portion 12, so as to be able to be rotated about the rotation shaft 31a.

Each link mechanism 32 is provided with a link component 41, a connection link 42, a link arm 43, a cable arm 44, and an arm spring 45.

The link component 41 is fixed integrally with the lever 31, and is rotatably connected to the connection link 42 by a movable rotation shaft 41a. The connection link 42 is rotatably connected to the link arm 43 by a movable rotation shaft 42a. The link arm 43 is supported so as to be able to be rotated about the rotation shaft 43a fixed on the frame portion 12. The link arm 43 brings a tip end portion 43b, which makes rotational movement about the rotation shaft 43a as a result of rotation of the link arm 43, into contact with the cable arm 44, and it is able to drive the cable arm 44 to rotate. The cable arm 44 is supported so as to be able to be rotated about the rotation shaft 44a fixed on the frame portion 12. The cable arm 44 is such that a tip end portion 44b, which makes rotational movement about the rotation shaft 44a as a result of rotation of the cable arm 44, is connected to the cable 33. The arm spring 45 gives the cable arm 44 a driving force to rotate about the rotation shaft 44a.

Figure 3A:
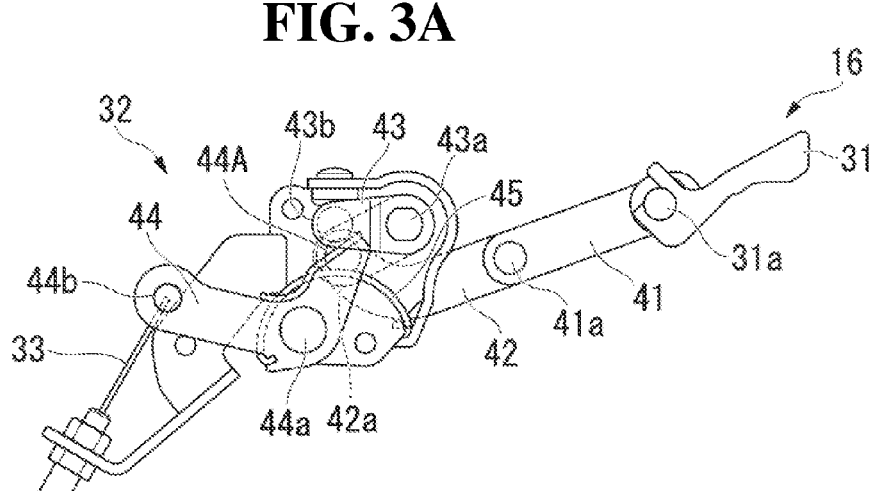
Figure 3B:
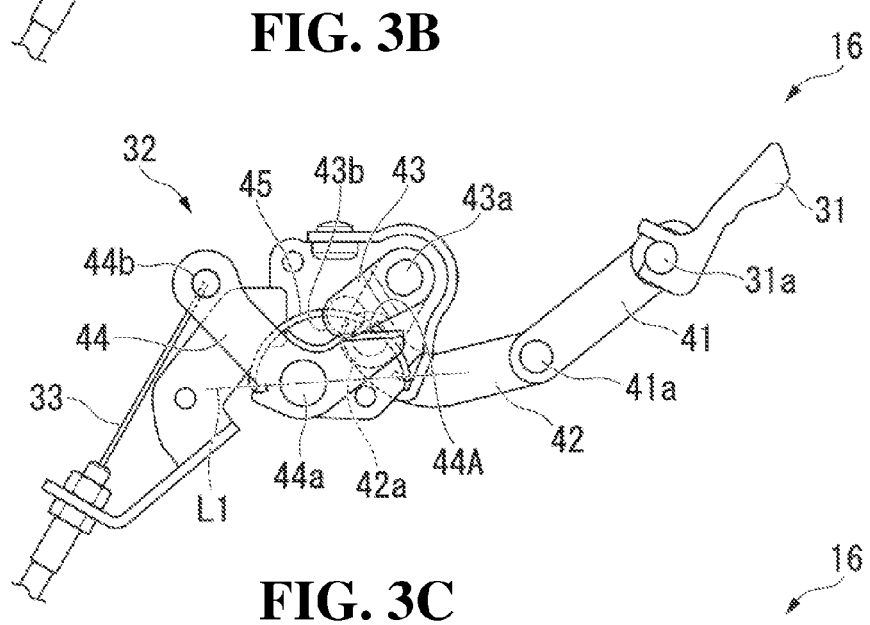
Figure 3C:
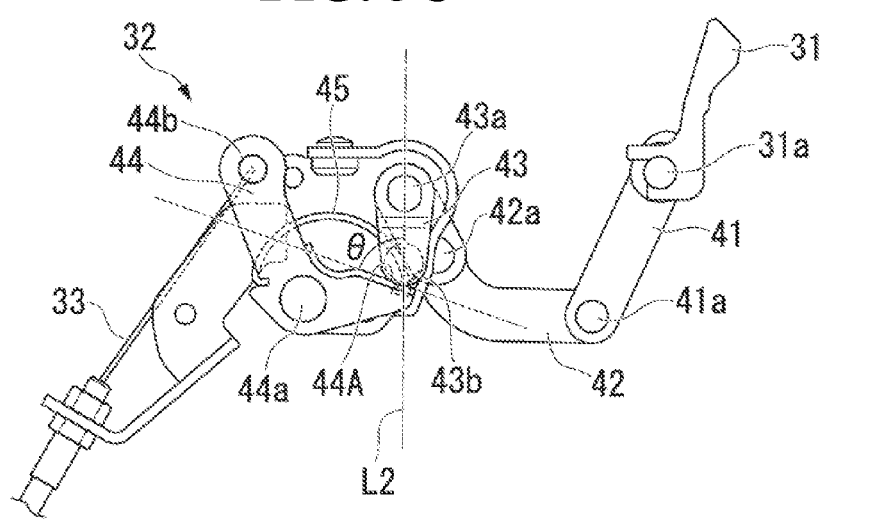
Figure 4:
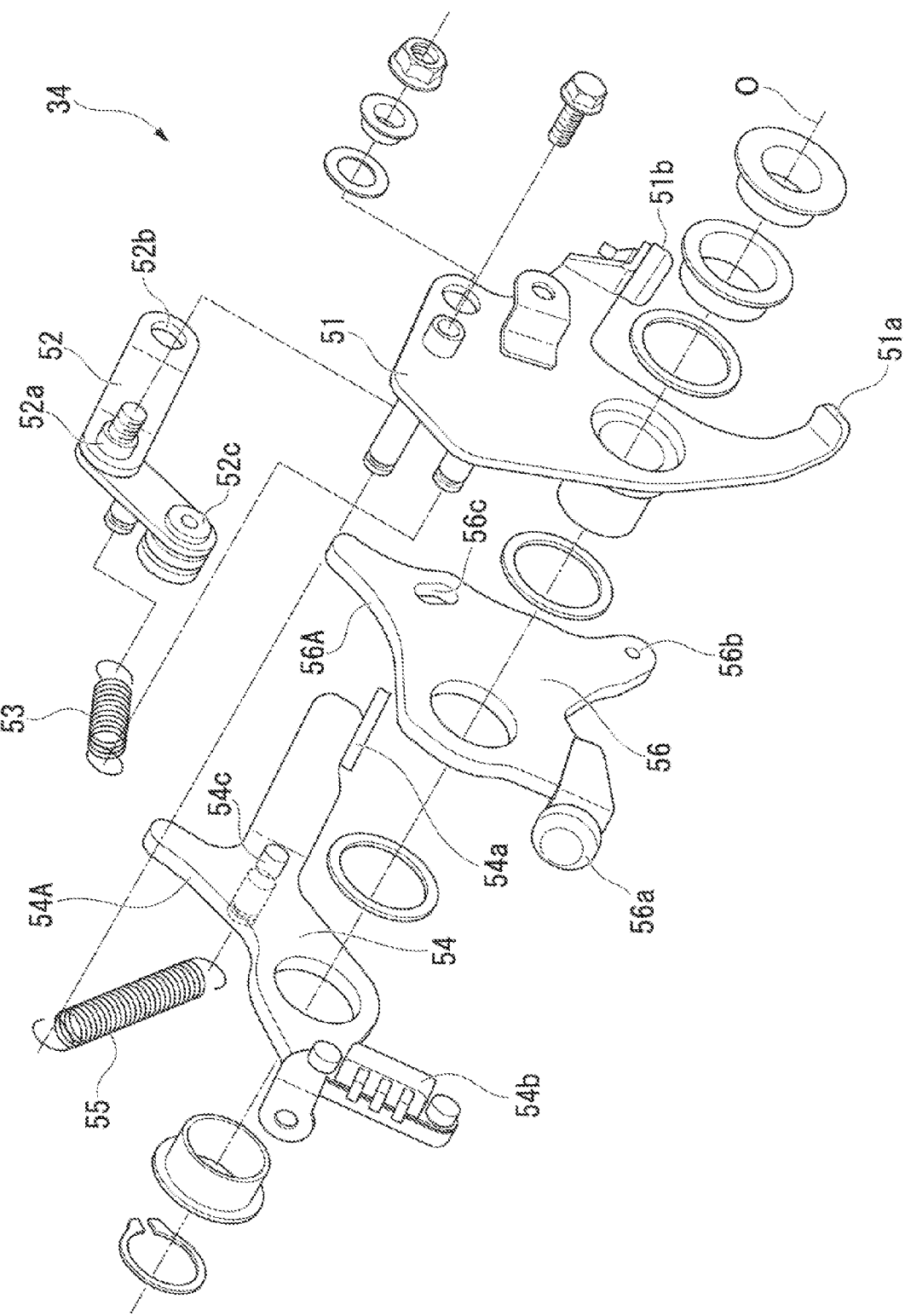
FIG. 4 is an exploded perspective view schematically showing a mechanical configuration around the rotation center of a main wheel of the inverted pendulum control type moving body according to the embodiment of the present invention.

The operation portion 16 can shift between the initial state shown in FIG. 3A and the locked state shown in FIG. 3C though the neutral state shown in FIG. 3B.

The initial state shown in FIG. 3A is a state where the cable 33 is not being pulled by the cable arm 44. The cable arm 44 is given by the arm spring 45, a rotational driving force about the rotation shaft 44a that tries to bring the tip end portion 44b toward the push-in direction of the cable 33. With respect to this rotational driving force about the rotation shaft 44a, the tip end portion 43b of the link arm 43 comes in contact with the cable arm 44 to restrict rotation of the cable arm 44 about the rotation shaft 44a.

The neutral state shown in FIG. 3B is a state where the cable 33 is being pulled by the cable arm 44 as a result of the lever 31 rotating about the rotation shaft 31a.

When shifting from the initial state shown in FIG. 3A to the neutral state shown in FIG. 3B, the cable arm 44 is given by the tip end portion 43b of the link arm 43, a rotational driving force about the rotation shaft 44a, that tries to bring the tip end portion 44b toward the pull-in direction of the cable 33, against the rotational driving force exerted by the arm spring 45. The link arm 43 is given by the lever 31 via the connection link 42 and the link component 41, a rotational driving force about the rotation shaft 43a so as to cause the tip end portion 43b to rotate the cable arm 44 about the rotation shaft 44a.

As shown in FIG. 3B, in the state where the straight line L1 which connects both ends of the arm spring 45, includes the center of the rotation shaft 44a, the rotational driving force about the rotation shaft 44a given to the cable arm 44 by the arm spring 45 is zero.

The locked state shown in FIG. 3C is a state where the cable 33 is maintained pulled out by the cable arm 44. When shifting from the neutral state shown in FIG. 3B to the locked state shown in FIG. 3C, the cable arm 44 is given by the arm spring 45 and the tip end portion 43b of the link arm 43, a rotational driving force about the rotation shaft 44a that tries to bring the tip end portion 44b toward the pull-in direction of the cable 33. The link arm 43 is given by the lever 31 via the connection link 42 and the link component 41, a rotational driving force about the rotation shaft 43a so as to cause the tip end portion 43b to rotate the cable arm 44 about the rotation shaft 44a.

The locked state shown in FIG. 3C is a state where the crossing angle θ changes so as to be less than 90° (right angle) between the straight line L2 that connects the tip end portion 43b of the link arm 43 and the rotation shaft 43a, and the surface 44A of the cable arm 44 with which the tip end portion 43b of the link arm 43 comes in contact. At this time, the tip end portion 43b of the link arm 43 is in contact with the cable arm 44 to restrict the cable arm 44 from rotating about the rotation shaft 44a so as to bring the tip end portion 44b toward the push-in direction of the cable 33.

As shown in FIG. 4 and FIG. 5A through FIG. 5C, each restriction mechanism 34 is provided with a link pivot plate 51, a cam 52, a cam return spring 53, a limiter plate 54, a limiter return spring 55, and stand link plate 56.

The link pivot plate 51 is fixed on the frame portion 12. The link pivot plate 51 is provided with: a first fixed restriction portion 51a (first restriction portion) which restricts first direction rotation of the link portion 14 supported so as to be able to rotate about the rotation center of the first driving portion 13 (that is to say, it restricts backward rotation direction rotation of the core body 21 about the rotation axis O); and a second fixed restriction portion 51b which restricts second direction rotation of the link portion 14 (that is to say, it restricts forward rotation direction rotation of the core body 21 about the rotation axis O).

The first fixed restriction portion 51a is provided so as to be able to come in contact with the first direction side surface 14A of the arm portion 14a of the link portion 14. It restricts the allowed forward leaning range with respect to a predetermined reference attitude of the inverted pendulum control type moving body 10 at the time of performing controls such as self-supporting control and traveling control of the inverted pendulum control type moving body 10, and in the uncontrolled state such as when the inverted pendulum control type moving body 10 is stopping and when the passenger is getting on/off.

The second fixed restriction portion 51b is provided so as to be able to come in contact with the second direction side surface 14B of the arm portion 14a of the link portion 14. It restricts the allowed backward leaning range with respect to the predetermined reference attitude of the inverted pendulum control type moving body 10 at the time of performing controls such as self-supporting control and traveling control of the inverted pendulum control type moving body 10. For example, the second fixed restriction portion 51b restricts the allowed backward leaning range for preventing a backward fall of the inverted pendulum control type moving body 10.

The cam 52 is supported so as to be able to rotate about the rotation shaft 52a fixed on the link pivot plate 51, and the first end portion 52b among the first end portion 52b and the second end portion 52c which make rotational movement about this rotation shaft 52a is connected to the cable 33. Moreover, the cam 52 brings the second end portion 52c in contact with the limiter plate 54 and the stand link plate 56, and it is able to drive the limiter plate 54 and the stand link plate 56 to rotate about the rotation center of the first driving portion 13.

The cam return spring 53 is connected to the link pivot plate 51 and to the position which is displaced to the second end portion 52c side from the rotation shaft 52a of the cam 52, and it gives the cam 52 a rotational driving force about the rotation shaft 52a, in particular, a rotational driving force which tries to bring the tip end portion 44b of the cable arm 44 of the link mechanism 32 toward the push-in direction of the cable 33.

The limiter plate 54 is supported so as to be able to rotate about the rotation axis O of the core body 21 of the main wheel 20. As a pressing force is input from the cam 52 to the surface 54A with which the second end portion 52c of the cam 52 comes in contact, the limiter plate 54 is driven to rotate in the first direction (that is, the backward rotation direction about the rotation axis O of the core body 21).

The limiter plate 54 is provided with; a second movable restriction portion (second restriction portion) 54a which makes rotational movement about the rotation axis O as a result of rotation of the limiter plate 54, and a stand switch 54b.

The second movable restriction portion 54a restricts the second direction rotation of the link portion 14, which is supported so as to be able to rotate about the rotation center of the first driving portion 13 (that is to say, it restricts forward rotation direction rotation about the rotation axis O of the core body 21). The second movable restriction portion 54a is provided so as to be able to come in contact with the second direction side surface 14B of the arm portion 14a of the link portion 14. It restricts the allowed backward leaning range with respect to the predetermined reference attitude of the inverted pendulum control type moving body 10 in the uncontrolled state such as when the inverted pendulum control type moving body 10 is stopping and when the passenger is getting on/off. For example, the second movable restriction portion 54a comes in contact with the second direction side surface 14B of the arm portion 14a of the link portion 14, and drives the arm portion 14a to rotate in the first direction about the rotation axis O, to thereby bring the bend portion 14b of the link portion 14 in contact with the movement plane S.

Thereby, the second movable restriction portion 54a restricts backward leaning of the inverted pendulum control type moving body 10.

The stand switch 54b is provided so as to be able to come in contact with a switch portion 56a of the stand link plate 56 described later, and it switches ON/OFF according to whether or not it is in contact with this switch portion 56a.

The limiter return spring 55 is connected to the link pivot plate 51 and to a position which is displaced from the rotation axis O to the second movable restriction portion 54a side on the limiter plate 54, and it gives, via the limiter plate 54 and a pin 54c of the limiter plate 54, the stand link plate 56 a rotational driving force about the rotation axis O, in particular, a second direction rotational driving force about the rotation axis O.

The stand link plate 56 is provided with the switch portion 56a which makes rotational movement about the rotation axis O as a result of rotation of the stand link plate 56. Moreover an end portion 56b which makes rotational movement about the rotation axis O as a result of rotation of the stand link plate 56 is connected to a stand arm 61 described later.

The switch portion 56a is provided so as to be able to come in contact with the stand switch 54b of the limiter plate 54, and it switches ON/OFF of the stand switch 54b according to whether or not it is in contact with this stand switch 54b.

The stand link plate 56 is provided with a pin attachment portion 56c on which the pin 54c of the limiter plate 54 is attached, and it is driven to rotate in the second direction about the rotation axis O by means of a returning force of the limiter return spring 55, via the pin 54c of the limiter plate 54 attached on this pin attachment portion 56c.

The supporting portion 17 is provided with: left and right stand arms 61 which are connected respectively to the left and right restriction mechanisms 34 of the operation portion 16; left and right stand link mechanisms 62 which are connected respectively to the left and right stand arms 61; and left and right steps/stands 63 which are connected respectively to the left and right stand link mechanisms 62.

Each stand arm 61 is provided so as to connect each stand link plate 56 and each stand link mechanism 62. Each stand arm 61 is connected to each stand link plate 56 so as to be able to be rotated, by a movable rotation shaft 61a at the end portion 56b of each stand link plate 56. Each stand arm 61 is connected to each stand link mechanism 62 so as to be able to be rotated, by a movable rotation shaft 62a in each stand link mechanism 62.

Each stand link mechanism 62 is supported so as to be able to be rotated about a rotation shaft 62b, by the rotation shaft 62b fixed on the frame portion 12. Each stand link mechanism 62 is such that an end portion 62c which rotates about the rotation shaft 62b as a result of rotation of each stand link mechanism 62, is fixed on each step/stand 63, and each step/stand 63 together with this end portion 62c can be driven to rotate about the rotation shaft 62b.

Figure 5A:
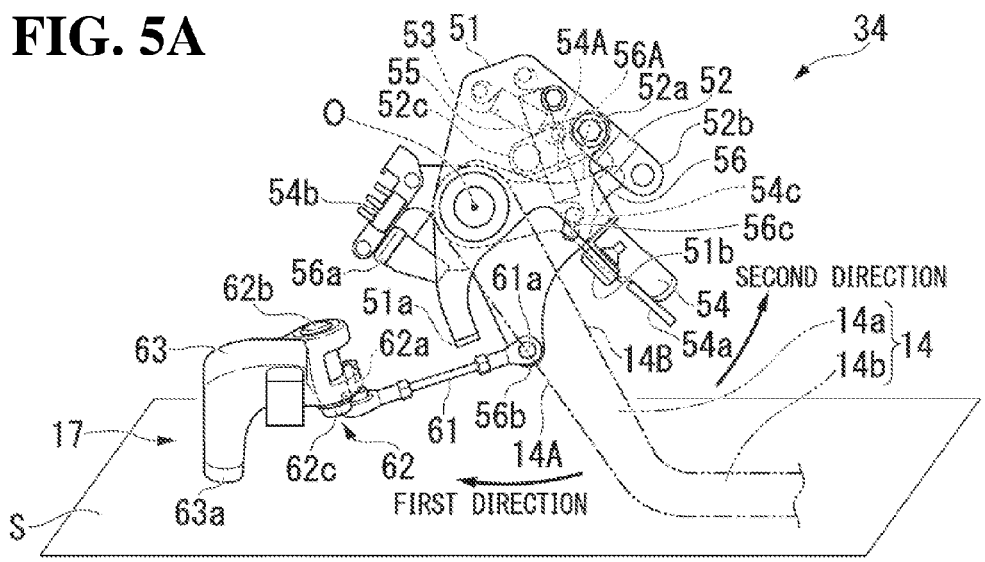
Figure 5B:
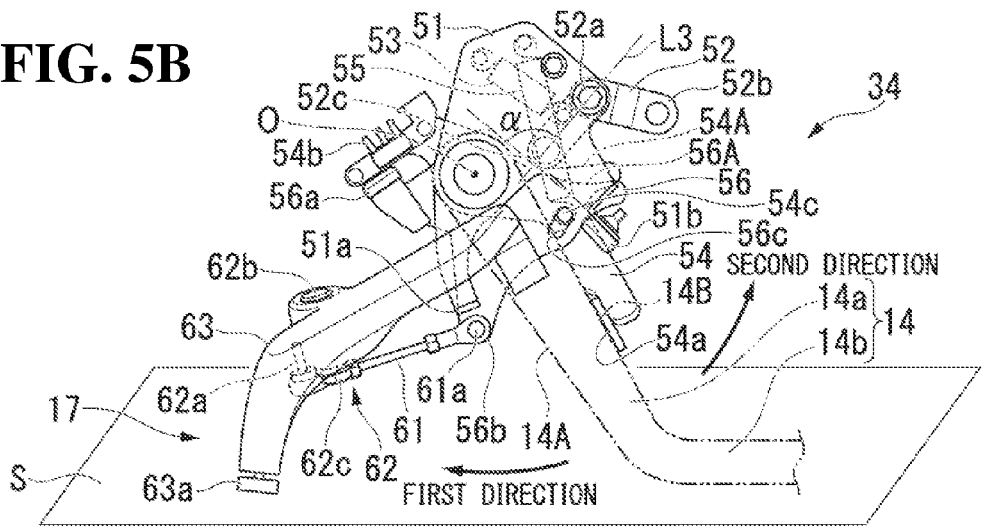
Figure 5C:
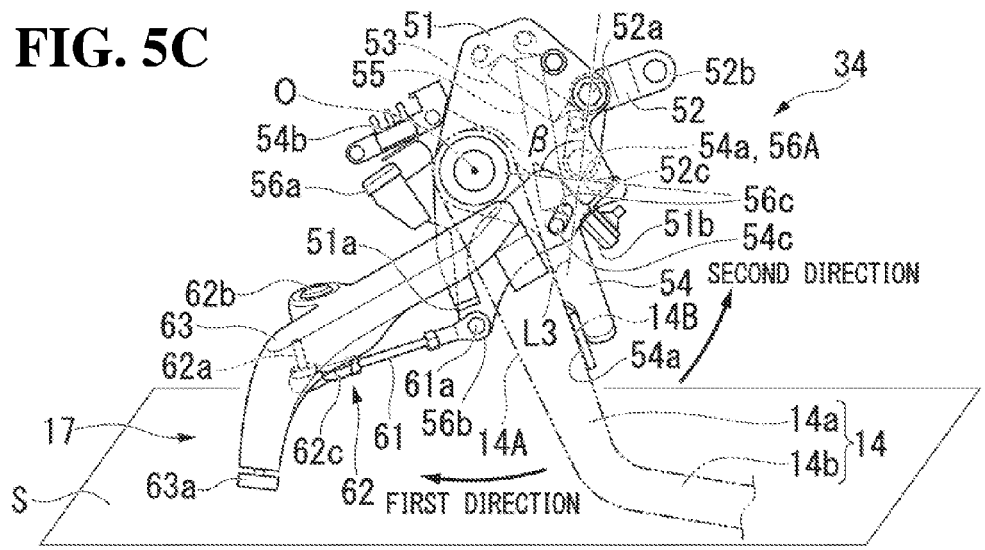

The left and right restriction mechanisms 34 can shift between the state of self-supporting control and traveling control shown in FIG. 5A, the stand-locked state shown in FIG. 5B, and the arm-locked state shown in FIG. 5C, according to changes in the operating state of the operation portion 16.

The state of self-supporting control and traveling control shown in FIG. 5A is a state where the first end portion 52b of the cam 52 is not being pulled by the cable 33, and it corresponds to the initial state of the operation portion 16 shown in FIG. 3A. The cam 52 is given by the cam return spring 53, a rotational driving force about the rotation shaft 52a that tries to bring the tip end portion 44b of the cable arm 44 of the link mechanism 32 toward the push-in direction of the cable 33.

The limiter plate 54 is given by the limiter return spring 55, a rotational driving force which rotates the second movable restriction portion 54a in the second direction about the rotation axis O. Thereby, the limiter plate 54 positions the second movable restriction portion 54a where it is displaced to the second direction side about the rotation axis O only by a predetermined clearance from the second fixed restriction portion 51b of the link pivot plate 51, in the state of being distanced from the second direction side surface 14B of the arm portion 14a of the link portion 14. In other words, the limiter plate 54 increases the distance between the first fixed restriction portion 51a of the link pivot plate 51 and the second movable restriction portion 54a. As a result, the arm portion 14a of the link portion 14 can rotate within the range of a step mode rotatable angle shown in FIG. 6. That is to say, the arm portion 14a of the link portion 14 can rotate to the position of the second fixed restriction portion 51b of the link pivot plate 51 toward the second direction side about the rotation axis O, and it can rotate to the position of the first fixed restriction portion 51a of the link pivot plate 51 toward the first direction side about the rotation axis O. As a result, the inverted pendulum control type moving body 10, with respect to the predetermined reference attitude, is allowed to lean backward until the arm portion 14a of the link portion 14 comes in contact with the second fixed restriction portion 51b, and it is allowed to lean forward until the arm portion 14a of the link portion 14 comes in contact with the first fixed restriction portion 51a.

In the state of self-supporting control and traveling control shown in FIG. 5A, the stand switch 54b of the limiter plate 54 is turned ON by having the switch portion 56a of the stand link plate 56 in contact.

The stand link plate 56 is given by a returning force of the limiter return spring 55, a rotational driving force which rotates the end portion 56b, to which the stand arm 61 is connected, in the second direction about the rotation axis O (that is, a driving force pulling the stand arm 61 backward), via the pin of the limiter plate 54. Thereby, the stand link plate 56, via the stand arm 61 and the stand link mechanism 62, gives the step/stand 63 a rotational driving force about the rotation shaft 62b which tries to maintain the step mode attitude state shown in FIG. 7A.

Figure 7A:
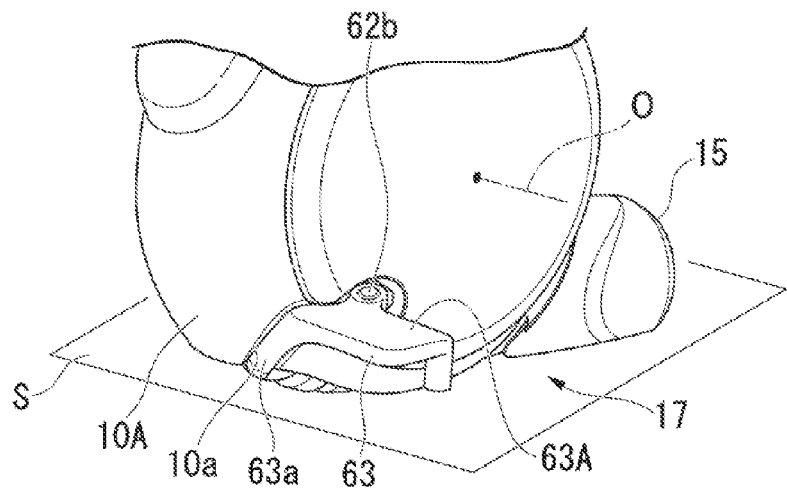

In the step mode shown in FIG. 7A, the respective left and right steps/stands 63 function as steps that support the passenger. Each step/stand 63 projects outward in the left-right direction parallel with the rotation axis O, while tilting a surface 63A which allows a passenger's foot to be placed thereon in the non-contact state where it is distanced from the movement plane S, only by a predetermined angle upward in the pitch direction where the left-right direction of the inverted pendulum control type moving body 10 is taken as the axis thereof.

The stand-locked state shown in FIG. 5B is a state where the first end portion 52b of the cam 52 is being pulled by the cable 33 as a result of the lever 31 of the operation portion 16 rotating about the rotation shaft 31a, and it corresponds to the state between the initial state of the operation portion 16 shown in FIG. 3A and the locked state of the operation portion 16 shown in FIG. 3C.

Figure 7B:
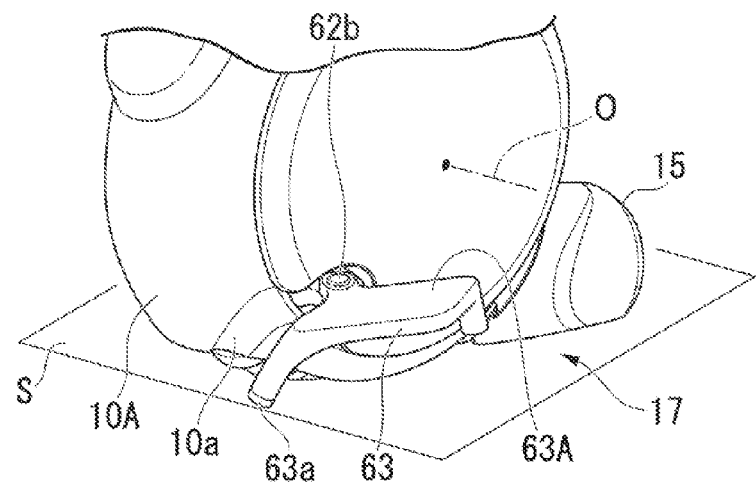

When shifting from the state of self-supporting control and traveling control shown in FIG. 5A to the stand-locked state shown in FIG. 5B, the cam 52 is given by the cable 33, a rotational driving force about the rotation shaft 52a for rotating the limiter plate 54 and the stand link plate 56 in the first direction about the rotation axis O by means of the second end portion 52c, against the driving force of the cam return spring 53. The limiter plate 54 is given by the second end portion 52c of the cam 52, a rotational driving force for rotating the second movable restriction portion 54a in the first direction about the rotation axis O, against the driving force of the limiter return spring 55. Thereby, the second movable restriction portion 54a comes in contact with the second direction side surface 14B of the arm portion 14a of the link portion 14, and drives the arm portion 14a to rotate in the first direction about the rotation axis O as necessary. The stand link plate 56 is given by the second end portion 52c of the cam 52, a rotational driving force in the first direction about the rotation axis O for rotating the end portion 56b in the first direction about the rotation axis O and pushing out the stand arm 61 forward. Thereby, the stand link plate 56, via the stand arm 61 and the stand link mechanism 62, gives the step/stand 63 a rotational driving force about the rotation shaft 62b which shifts it from the step mode attitude state shown in FIG. 7A through the mode-switching attitude state shown in FIG. 7B to the stand mode attitude state shown in FIG. 7C.

Figure 7C:
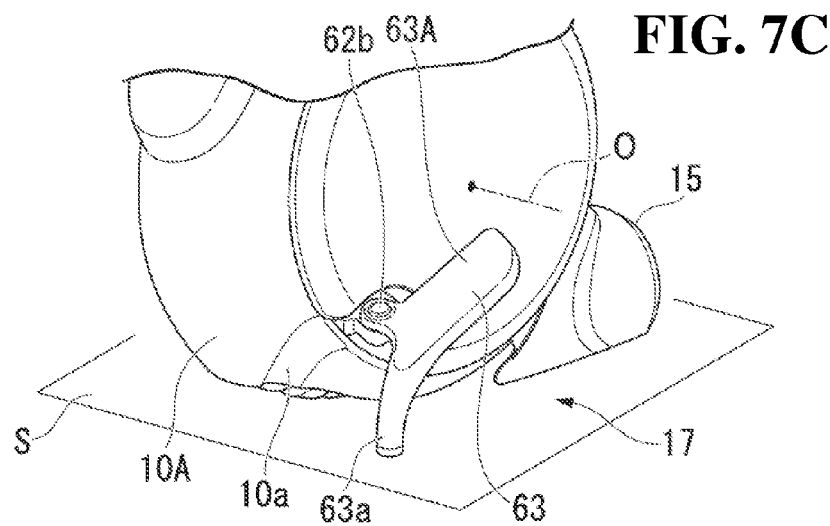

The stand locked state shown in FIG. 5B is a state where each of the left and right steps/stands 63 maintains the attitude state to function as a stand which supports the frame portion 12, in the stand mode shown in FIG. 7C. This state is a state where the crossing angle α is 90° (right angle) between the straight line L3 which connects the second end portion 52c of the cam 52 and the rotation shaft 52a, and the surface 56A of the stand link plate 56 with which the second end portion 52c of the cam 52 comes in contact. At this time, the cam 52 restricts the stand link plate 56 from rotating about the rotation axis O. Accordingly, each step/stand 63 maintains the state of the surface 63A being tilted with respect to the horizontal plane to a degree where a passenger's foot cannot be placed on the surface 63A, as a result of the cam 52 restricting the stand link plate 56 from rotating about the rotation axis O. That is to say, the angle of the surface 63A with respect to the horizontal plane is great than for when in the step mode. Furthermore, each step/stand 63 causes a supporting end portion 63a, which was housed in a housing portion 10a of a cover 10A of the inverted pendulum control type moving body 10 in the step mode shown in FIG. 7A, to project outward in the left-right direction, and maintains this supporting end portion 63a in the attitude state where it can be in contact with the movement plane S.

The arm-locked state shown in FIG. 5C is a state where the first end portion 52b of the cam 52 is maintained pulled by the cable 33 as a result of the lever 31 of the operation portion 16 rotating about the rotation shaft 31a, and it corresponds to the locked state of the operation portion 16 shown in FIG. 3C.

When shifting from the stand-locked state shown in FIG. 5B to the arm-locked state shown in FIG. 5C, the cam 52 is given by the cable 33, a rotational driving force about the rotation shaft 52a for rotating the limiter plate 54 in the first direction about the rotation axis O by means of the second end portion 52c, against the driving force of the cam return spring 53. The limiter plate 54 is given by the second end portion 52c of the cam 52, a rotational driving force for rotating the arm portion 14a of the link portion 14 to a predetermined position in the first direction about the rotation axis O (arm lock threshold position) by means of the second movable restriction portion 54a, against the driving force of the limiter return spring 55. Thereby, the limiter plate 54 brings the bend portion 14b of the link portion 14 into contact with the movement plane S, and restricts backward leaning of the inverted pendulum control type moving body 10. The stand link plate 56 maintains each step/stand 63 in the state of stand mode attitude shown in FIG. 7C by having the cam 52 restricting rotation about the rotation axis O. That is to say, there is maintained a state where the crossing angle α is 90° (right angle) between the straight line L3 which connects the second end portion 52c of the cam 52 and the rotation shaft 52a, and the surface 56A of the stand link plate 56 with which the second end portion 52c of the cam 52 comes in contact.

Figure 6:
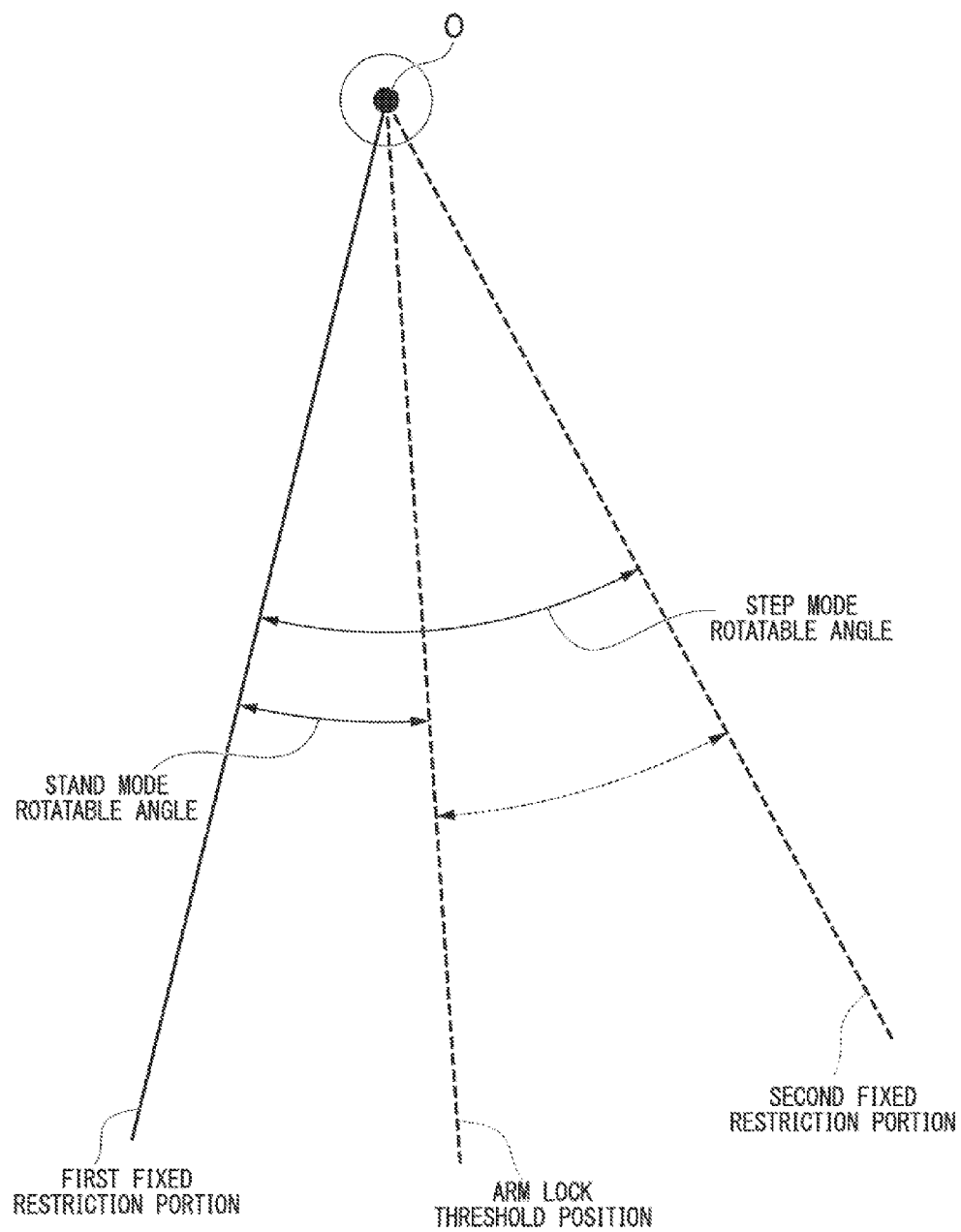
FIG. 6 is a diagram showing the rotatable angle of a link portion of the main wheel of the inverted pendulum control type moving body (that is, tiltable angle of the inverted pendulum control type moving body) according to the embodiment of the present invention.

The arm-locked state shown in FIG. 5C is a state where the crossing angle β is 90° (right angle) between the straight line L3 which connects the second end portion 52c of the cam 52 and the rotation shaft 52a, and the surface 54A of the limiter plate 54 with which the second end portion 52c of the cam 52 comes in contact. At this time, the cam 52 supports the rotational driving force which is given by the limiter return spring 55, to rotate the limiter plate 54 in the second direction about the rotation axis O, and restricts the limiter plate 54 from rotating in the second direction about the rotation axis O. As a result, the cam 52 maintains the state where the limiter plate 54 restricts the arm portion 14a of the link portion 14 from rotating in the second direction from the predetermined position (arm lock threshold position) about the rotation axis O. That is to say, as shown in FIG. 6, compared to the time of performing self-supporting control and traveling control shown in FIG. 5A, the limiter plate 54 reduces the distance from the first fixed restriction portion 51a of the link pivot plate 51 to the second movable restriction portion 54a, and it reduces the rotatable angle of the link portion 14 about the rotation axis O (stand mode rotatable angle). As a result, compared to the time of performing self-supporting control and traveling control shown in FIG. 5A, the inverted pendulum control type moving body 10 has the allowed backward leaning range (that is, tiltable angle) restricted to a smaller range.

In the arm-locked state shown in FIG. 5C, the stand switch 54b of the limiter plate 54 is turned OFF by having the switch portion 56a of the stand link plate 56 being distanced.

ON/OFF of the stand switch 54b is used for control switching performed by a later described control device 106 (control portion) (not shown in the figure).

The control device 106 executes controls such as self-supporting control and traveling control of the inverted pendulum control type moving body 10 when the stand switch 54b is in the ON state. When the stand switch 54b is switched from ON to OFF, the control device 106 ends controls such as self-supporting control and traveling control of the inverted pendulum control type moving body 10, and starts to perform a ground contact process. The control device 106 brings the supporting end portion 63a of each step/stand 63 into contact with the movement plane S by causing the inverted pendulum control type moving body 10 to lean forward by means of the ground contact process. Thereby, each step/stand 63 supports the inverted pendulum control type moving body 10.

The control device 106 ends the ground contact process while maintaining the state where the inverted pendulum control type moving body 10 is supported by each step/stand 63, and shifts to the uncontrolled state where stopping of the inverted pendulum control type moving body 10 and getting on/off of the passenger are allowed.

The inverted pendulum control type moving body 10 of the present embodiment is provided with the above configuration. Next, operations of this inverted pendulum control type moving body 10 are described.

Hereunder, there is described the first operation which is performed when shifting from the uncontrolled state such as when stopping the inverted pendulum control type moving body 10 where backward leaning attitude is restricted and when the passenger is getting on/off, to the controls such as self-supporting control and traveling control where backward leaning of the inverted pendulum control type moving body 10 is allowed.

First, in the uncontrolled state of the inverted pendulum control type moving body 10, when the passenger operates the lever 31 so as to release the locked state of the operation portion 16, the cable 33 is pushed into the restriction mechanism 34 from the operation portion 16, by means of the returning force of each arm spring 45 and cam return spring 53 of the operation portion 16.

Then, when the cam 52 of the restriction mechanism 34 is driven via the cable 33 to rotate, rotation restriction of the limiter plate 54 and the stand link plate 56 performed by the cam 52 is released. By means of the returning force of the limiter return spring 55, the limiter plate 54 and the stand link plate 56 are driven to rotate in the second direction about the rotation axis O.

Here, if the limiter plate 54 rotates in the second direction about the rotation axis O, the second movable restriction portion 54a separates from the first fixed restriction portion 51a of the link pivot plate 51, and the distance between the second movable restriction portion 54a and the first fixed restriction portion 51a is increased. The stand switch 54b of the limiter plate 54 is turned ON by having the switch portion 56a of the stand link plate 56 coming in contact, and it is shifted to the control of the inverted pendulum control type moving body 10 where the self-supporting control and the traveling control are executed. In addition to this, if the stand link plate 56 rotates in the second direction about the rotation axis O, the steps/stands 63 are driven to rotate via the stand arm 61 of the supporting portion 17, and the steps/stands 63 shift from the stand mode attitude state to the step mode attitude state.

Hereunder, there is described the second operation which is performed when shifting from the controls such as self-supporting control and traveling control where backward leaning of the inverted pendulum control type moving body 10 is allowed, to the uncontrolled state such as when stopping the inverted pendulum control type moving body 10 where backward leaning attitude is restricted and when the passenger is getting on/off.

First, at the time of performing controls such as self-supporting control and traveling control of the inverted pendulum control type moving body 10, when the passenger operates the lever 31 so as to shift the operation portion 16 to the locked state, the cable 33 is pulled out from the restriction mechanism 34 by the operation portion 16, against each returning force of the arm spring 45 and the cam return spring 53.

Then, when the cam 52 of the restriction mechanism 34 is driven via the cable 33 to rotate, the cam 52 drives the limiter plate 54 and the stand link plate 56 to rotate in the first direction about the rotation axis O, against the returning force of the limiter return spring 55.

Here, if the limiter plate 54 rotates in the first direction about the rotation axis O, the second movable restriction portion 54a approaches the first fixed restriction portion 51a of the link pivot plate 51, and the distance between the second movable restriction portion 54a and the first fixed restriction portion 51a is reduced. In addition to this, if the stand link plate 56 rotates in the first direction about the rotation axis O, the steps/stands 63 are driven to rotate via the stand arm 61 of the supporting portion 17, and the steps/stands 63 shift from the step mode attitude state to the stand mode attitude state.

Then, the stand switch 54b of the limiter plate 54 is turned OFF by having the switch portion 56a of the stand link plate 56 separating, and it is shifted to the uncontrolled state of the inverted pendulum control type moving body 10 where the inverted pendulum control type moving body 10 is stopped and/or the passenger is getting on/off the inverted pendulum control type moving body 10.

Figure 8:
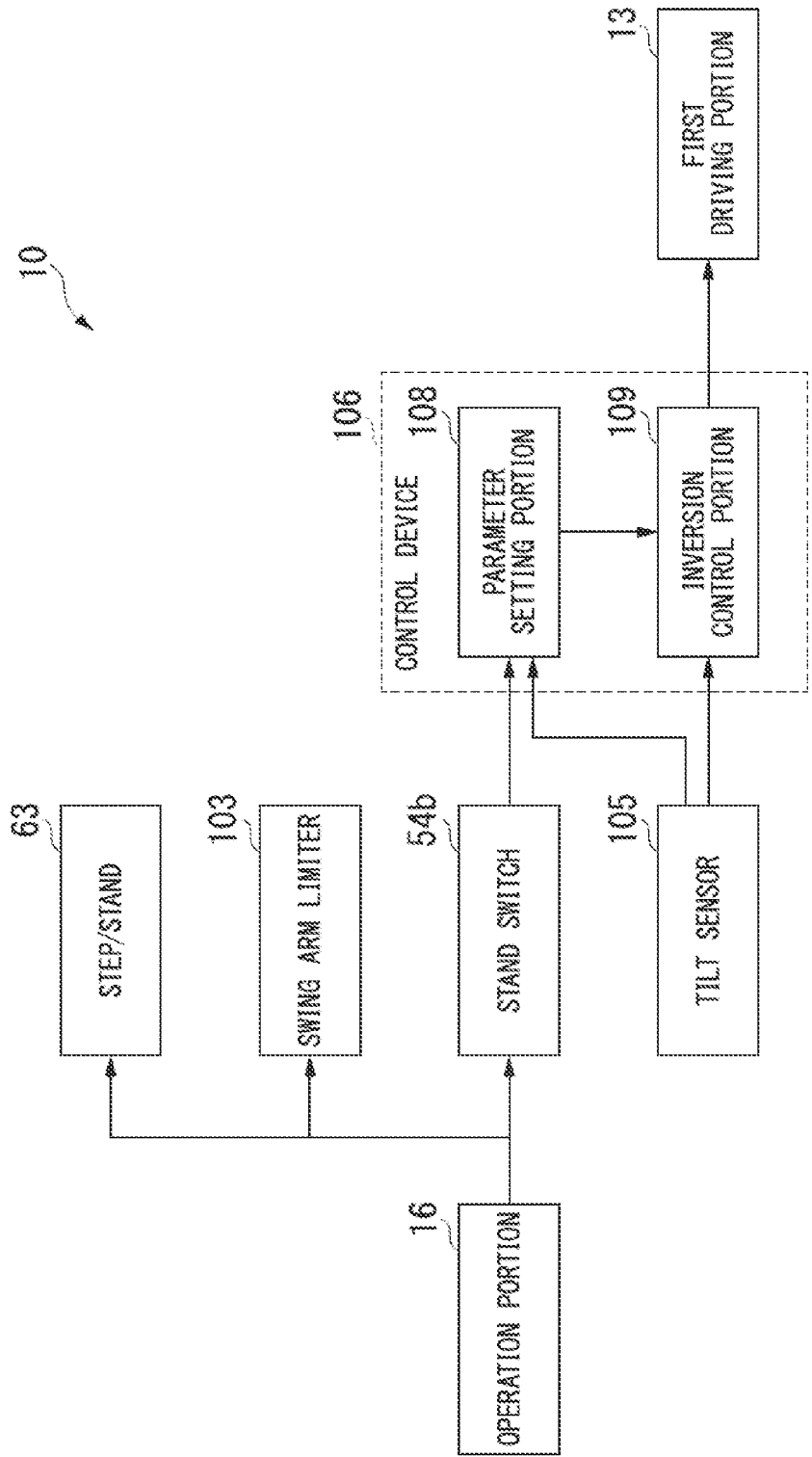
FIG. 8 is a schematic block diagram showing a configuration of a control device 106 of an inverted pendulum control type moving body 10 according to the embodiment of the present invention.

FIG. 8 is a schematic block diagram showing a configuration of a control device 106 of an inverted pendulum control type moving body 10. The inverted pendulum control type moving body 10 includes an operation portion 16, a step/stand 63, a swing arm limiter 103, a stand switch 54b, a tilt sensor 105, a control device 106, and a first driving portion 13. The control device 106 includes a parameter setting portion 108 and an inversion control portion 109. In FIG. 8, portions that correspond to the respective portions in FIG. 1 are given the same reference symbols (13, 16, 54b, and 63), and descriptions thereof are omitted. Hereafter, the state where the step/stand 63 is in the standard mode and is in contact with the movement plane S is referred to as ground contact state, and the state where the step/stand 63 is in the step mode and is away from the movement plane S is referred to as ground separation state.

In the case where the movement plane S is horizontal, when the step/stand 63 is in the ground contact state and the inverted pendulum control type moving body 10 is made to stand independently, the forward/backward direction tilt angle of the inverted pendulum control type moving body 10 is tilted forward by 5 degrees. The forward/backward direction tilt angle is an angle subtended between a line through the center of gravity of the inverted pendulum control type moving body 10 and the rotation axis O of the first driving portion 13 at the time of moving the inverted pendulum control type moving body 10 in the forward/backward direction, and a vertical line being a direction perpendicular to the rotation axis and the forward/backward direction.

The swing arm limiter 103 comprises a first fixed restriction portion 51a and a second movable restriction portion 54a shown in FIG. 1, and it restricts rotation of the link portion 14 when the operation portion 16 is in the locked state. As described above, the stand switch 54b is brought to the closed (ON) state when the locked state of the operation portion 16 is released and the step/stand 63 is in the ground separation state, and is brought to the open (OFF) state when the operation portion 16 is in the locked state and the step/stand 63 is in the ground contact state.

The tilt sensor 105 is provided on the frame portion 12 and detects a title angle of the inverted pendulum control type moving body 10. For example, the tilt sensor 105 is a sensor that combines an acceleration sensor and a gyro sensor.

The parameter setting portion 108 sets a target tilt angle and a control gain (feedback gain) for the inversion control portion 109 according to the detection result of the tilt sensor 105 and ON/OFF of the stand switch 54b. When the operation portion 16 switches the state of the step/stand 63 from the ground contact state to the ground separation state, the parameter setting portion 108 sets a target tilt angle for the inversion control portion 109 so that the forward/backward direction tilt angle of the inverted pendulum control type moving body 10 approximates the target tilt angle in the ground separation state. Moreover, when the operation portion 16 switches the state of the step/stand 63 from the ground separation state to the ground contact state, the parameter setting portion 108 sets a target tilt angle for the inversion control portion 109 so that the forward/backward direction tilt angle of the inverted pendulum control type moving body 10 approximates the target tilt angle in the ground contact state, and it sets a control gain that approximates "0" for the inversion control portion 109 as the tilt angle approximates the target tilt angle in the ground contact state.

The inversion control portion 109 performs inversion control for controlling rotation of the first driving portion 13 so that the tilt angle of the inverted pendulum control type moving body 10 becomes the target tilt angle set by the parameter setting portion 108. The inversion control portion 109 performs feedback according to the detection result of the tilt sensor 105 when performing this control. However, as the gain of this feedback, it uses a control gain set by the parameter setting portion 108.

Figure 9:
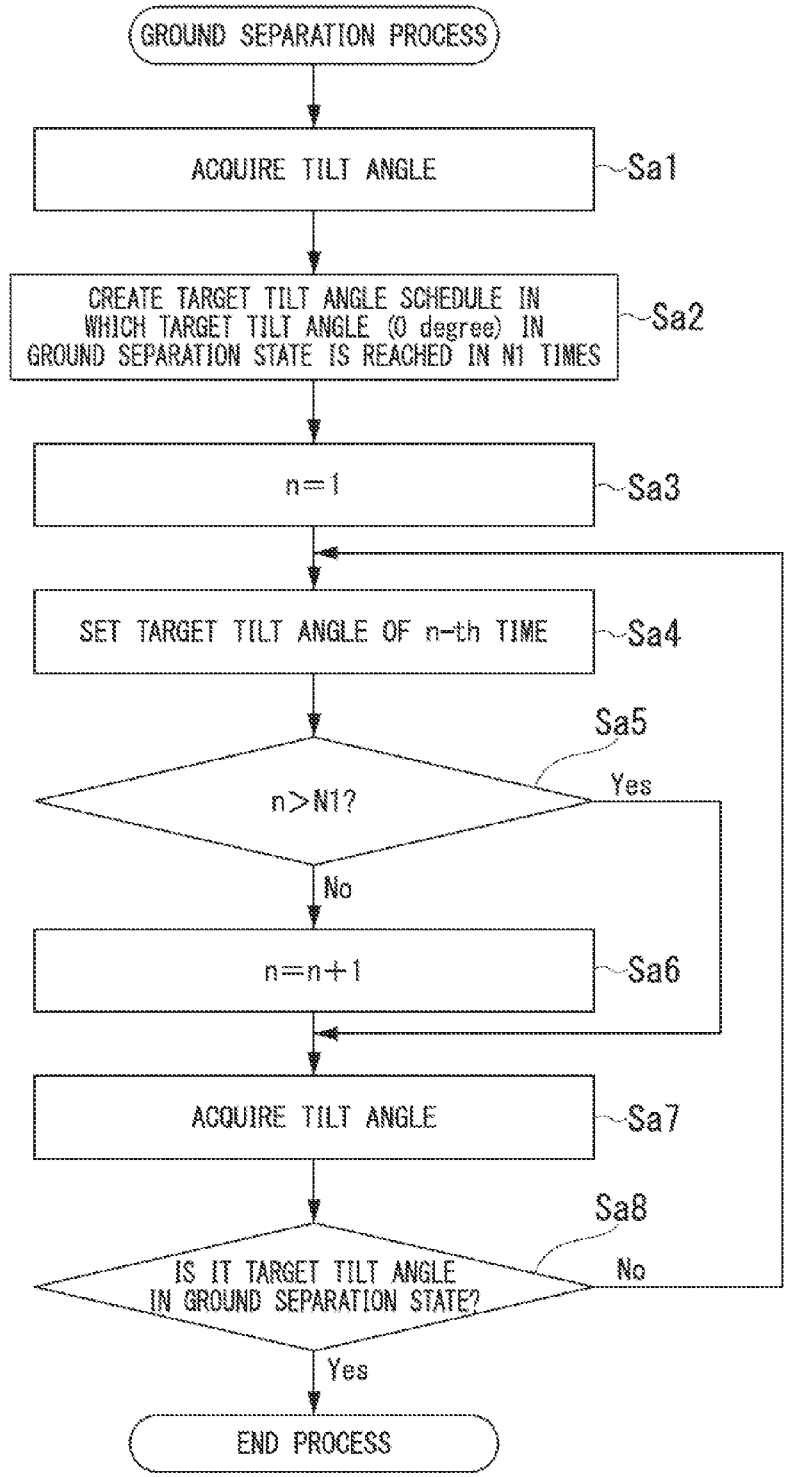
FIG. 9 is a flowchart for describing a ground separation process performed by a parameter setting portion 108 according to the embodiment of the present invention.

FIG. 9 is a flowchart for describing a ground separation process performed by the parameter setting portion 108. Here, the ground separation process is a process that is performed by the parameter setting portion 108 at the time of the first operation described above, that is, when the passenger gets on the inverted pendulum control type moving body 10 and releases the locked state of the operation portion 16 to start traveling, and the state of the step/stand 63 changes from the ground contact state to the ground separation state.

More specifically, the parameter setting portion 108 performs the ground separation process upon detecting the stand switch 54b having switched from OFF to ON.

First, the parameter setting portion 108 acquires a tilt angle detected by the tilt sensor 105 (Sa1). Next, the parameter setting portion 108 creates a target tilt angle schedule in which the target tilt angle in the ground separation state is reached from the current tilt angle in N1 times (Sa2). For example, the parameter setting portion 108 creates a schedule such that the angle between the current tilt angle and the target tilt angle in the ground separation state is divided equally by N1, and the ones that are closer to the current tilt angle are sequentially taken as a target tilt angle. This target tilt angle in the ground separation state is a preliminarily set value (0 degree), and it is, for example, the tilt angle of the inverted pendulum control type moving body 10 when a passenger is sitting and traveling on the inverted pendulum control type moving body 10.

Next, the parameter setting portion 108 assigns "1" to the variable n, and initializes (Sa3).

The parameter setting portion 108 then sets, from the schedule created in step Sa2, the target tilt angle of the n-th time, to the inversion control portion 109 (Sa4). As a result, the inversion control portion 109 starts inversion control in a manner so that the tilt angle of the inverted pendulum control type moving body 10 becomes the target tilt angle. At this time, as a control gain, the parameter setting portion 108 may set a value that is used at the time of traveling. Next, it is determined whether or not n has exceeded N1 times (Sa5). If it has not exceeded (Sa5—No), a value in which 1 is added to n is assigned (Sa6), and the process proceeds to step Sa7. If it has exceeded (Sa5—Yes), the process proceeds straight to step Sa7. In step Sa7, the parameter setting portion 108 acquires the current tilt angle detected by the tilt sensor 105 (Sa7). The parameter setting portion 108 then determines whether or not the acquired current tilt angle is within a predetermined range from the target tilt angle in the ground separation state (Sa8). If it is not within the predetermined range (Sa8—No), the process returns to step Sa4, and it is repeated until the tilt angle is within the predetermined range.

If it is within the predetermined range (Sa8—Yes), the parameter setting portion 108 ends the ground separation process. As a result, after the ground separation process has ended, the inversion control portion 109 performs inversion control in a manner so that the tilt angle of the inverted pendulum control type moving body 10 becomes the final target tilt angle.

FIG. 10 is a flowchart for describing a ground contact process performed by the parameter setting portion 108.

Here, the ground contact process is a process that is performed by the parameter setting portion 108 at the time of the second operation described above, that is, when the passenger brings the operation portion 16 to the locked state in order to get off the inverted pendulum control type moving body 10, and the state of the step/stand 63 changes from the ground separation state to the ground contact state. More specifically, the parameter setting portion 108 performs the ground contact process upon detecting the stand switch 54b having switched from ON to OFF.

In FIG. 10, portions that correspond to the respective portions in FIG. 9 are given the same reference symbols (Sa1, Sa3, Sa4, Sa6, and Sa7), and descriptions thereof are omitted. The flowchart of FIG. 10 differs from the flowchart of FIG. 9 only in that there are steps of Sb2, Sb5, and Sb9 instead of steps of Sa2, Sa5, and Sa8 respectively, and in that there is a step Sb8 between step Sa1 and step Sb9.

In step Sb2, the parameter setting portion 108 creates a schedule of the target tilt angle and control gain in which the target tilt angle in the ground contact state (for example, 5 degrees) is reached from the current tilt angle in N2 times. For example, the parameter setting portion 108 creates a schedule such that the angle between the current tilt angle and the target tilt angle in the ground contact state is divided equally by N2, and the ones that are closer to the current tilt angle are sequentially taken as a target tilt angle.

This target tilt angle in the ground contact state is a preliminarily set value (5 degrees forward), and it is, for example, the tilt angle of the inverted pendulum control type moving body 10 when the step/stand 63 is functioning as a stand and the inverted pendulum control type moving body 10 is supported by the step/stand 63 and is standing independently. Here, the tilt angle of the inverted pendulum control type moving body 10 when the inverted pendulum control type moving body 10 is supported by the step/stand 63 and is standing independently is 5 degrees forward, because by tilting the seat plane forward compared to that at the time of traveling, it is easier for the passenger to get on and off the vehicle. The seat plane may be tilted backward to thereby make it easier for the passenger to get on and off the vehicle from the rear side.

In step Sb5, it is determined whether or not n has exceeded N2 times. In step Sb8, the parameter setting portion 108 sets a control gain according to the tilt angle acquired in step Sa1. The parameter setting portion 108 preliminarily memorizes control gains according to tilt angles. This control gain takes a value that approximates "0" as the tilt angle approximates the target tilt angle in the ground contact state. In step Sb9, the parameter setting portion 108 determines whether the tilt angle is within a predetermined range from the target tilt angle in the ground contact state, whether the control gain is "0", or whether a predetermined number of seconds or more have elapsed since the start of the ground contact process. If none of them is valid (Sb9—No), the process returns to step Sa4, and if any one of them is valid (Sb9—Yes), the ground contact process ends. As a result, after the ground contact process has ended, the inversion control portion 109 does not perform inversion control, and the inverted pendulum control type moving body 10 stands independently by means of the step/stand 63 and the first driving portion 13. When "0" is set as a control gain in step Sb8, the inversion control portion 109 may stop the inversion control.

As described above, according to the inverted pendulum control type moving body 10 of the present embodiment, by operating the operation portion 16, the passenger can bring the state of the supporting portion into the ground separation state, and can change the forward/backward direction tilt angle of the inverted pendulum control type moving body 10 to the rear side compared to the tilt angle for getting on and off the vehicle, that is, the tilt angle at the time of being supported by the supporting portion 17 and standing independently. Therefore, the passenger can change the tilt angle to the rear side while in a stable attitude where at least one foot or preferably both feet are placed on the movement plane S, and as a result, the passenger can, while feeling stability, get on the vehicle and shift the tilt angle to a tilt angle that is suitable for traveling.

As described above, according to the inverted pendulum control type moving body 10 of the present embodiment, by operating the operation portion 16, the passenger can bring the state of the supporting portion into the ground separation state, and can make the forward/backward direction tilt angle of the inverted pendulum control type moving body 10 to approximate the tilt angle for getting on and off the vehicle, that is, the tilt angle at the time of being supported by the supporting portion 17 and standing independently. Therefore, the passenger can, while in a stable attitude where at least one foot or preferably both feet are placed on the movement plane S, bring the tilt angle to the approximate tilt angle at the time of being supported by the supporting portion 17 and standing independently, and get off the vehicle. As result, the passenger can, while feeling stability, get off the vehicle.

Furthermore, by means of the lever 31, it is possible to synchronously operate whether or not to bring the steps/stands 63 into contact with the movement plane S, and set the distance between the first fixed restriction portion 51a of the link pivot plate 51 and the second movable restriction portion 54a of the limiter plate 54. As a result, it is possible to execute appropriate attitude control at the time of performing controls (at the time of executing the first operation) such as self-supporting control and traveling control, which allow a backward leaning attitude, while ensuring stable attitude maintenance in an uncontrolled state (at the time of executing the second operation) such as when stopping and/or getting on/off the moving body where backward leaning attitude is not allowed.

Furthermore, so as to make an additional location of supporting the frame portion 12 in the uncontrolled state, other than the second driving portion 15, which is connected to the link portion 14, the steps/stands 63 are made to function as a stand in addition to the function as a step, and therefore, an increase in the number of components can be prevented.

Moreover, a backward leaning attitude is allowed by the second movable restriction portion 54a of the limiter plate 54 at the time of performing controls such as self-supporting control and traveling control, and the backward leaning attitude is restricted by the second movable restriction portion 54a of the limiter plate 54 in the uncontrolled state such as stopping and getting on/off. That is to say, by means of the lever 31, it is possible, only by operating the rotation of the second movable restriction portion 54a of the limiter plate 54 about the rotation axis O, to easily switch the attitude state.

Furthermore, the steps/stands 63 and the second movable restriction portion 54a can also be sharedly used as mechanical elements (such as cam 52 and cable 33) which are connected to the lever 31, and it is possible to prevent an increase in the number of components and synchronously operate the steps/stands 63 and the second movable restriction portion 54a.

Moreover, in the uncontrolled state, each of the left and right steps/stands 63 maintains the state of the surface 63A being tilted to a degree where passenger's foot cannot be placed on the surface 63A, and therefore, it is possible to prompt the passenger to take a stable posture with their foot placed on the movement plane S. As a result, it is possible to smoothly shift from the stand mode to the step mode in the state where passenger's stable posture is maintained.

The embodiment described above is illustrated as an example, and it is not intended to limit the scope of the invention. The above novel embodiment may be carried out in various other forms, and various types of omission, substitution, and/or modification may be made without departing from the scope of the invention.

For example, in the embodiment described above, the supporting portion 17 switches between the step mode attitude state and the stand mode attitude state by having the left and right steps/stands 63 rotating about the rotation shaft 62b. However, it is not limited to this, and another mechanism may be employed.

Figure 11A:
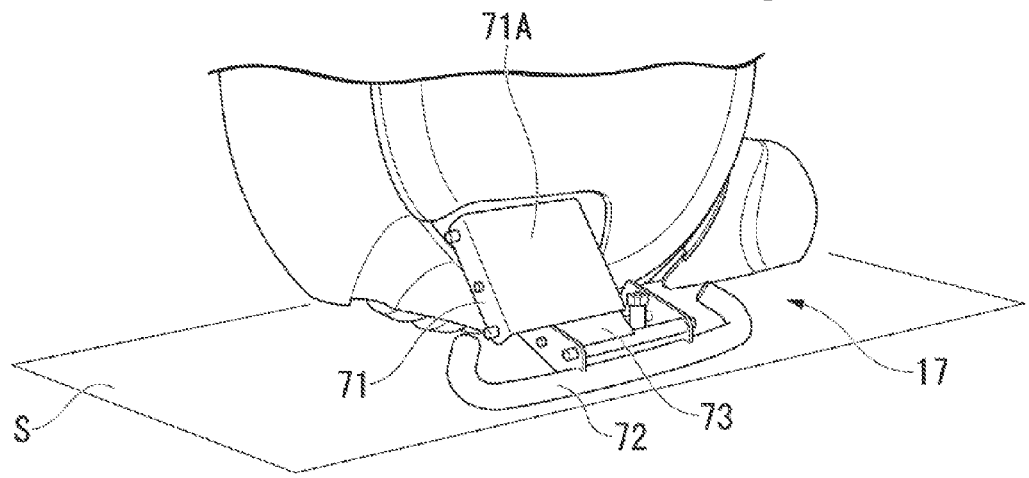
Figure 11B:
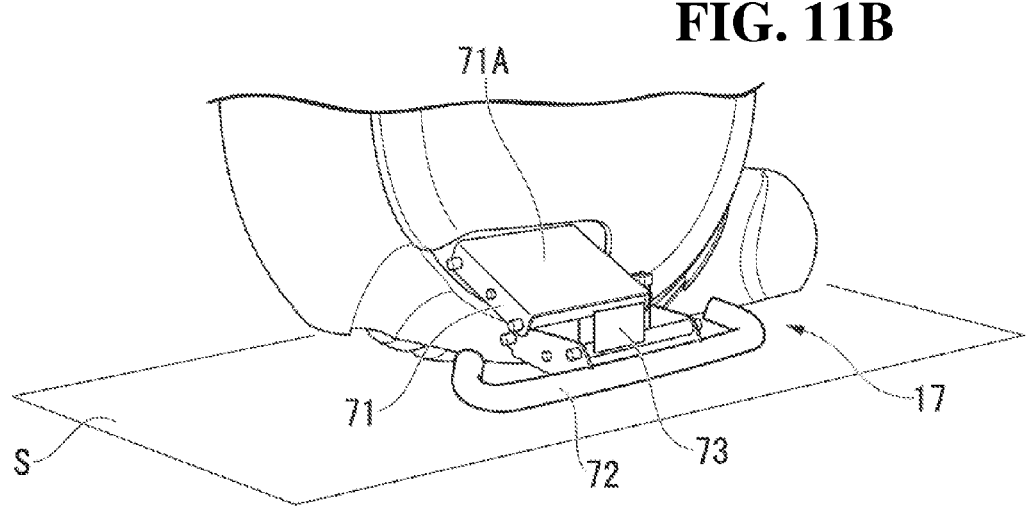
Figure 11C:
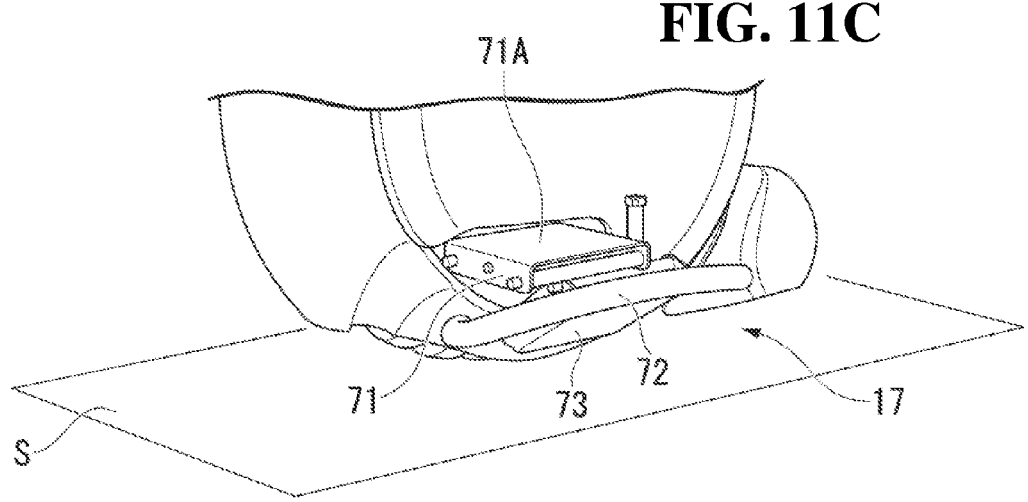

For example, in the modified examples shown in FIG. 11A through FIG. 11C, the supporting portion 17 is provided with a step portion 71 and a skid portion 72 which project outward in the left-right direction of the inverted pendulum control type moving body 10. The step portion 71 is supported by a supporting member 73 so as to be able to shift between the state where a passenger's foot can be placed on a surface 71A, and the state of being tilted to a degree where the passenger's foot cannot be placed on the surface 71A. The skid portion 72 is fixed integrally with the supporting member 73, and is able to shift between the state where it separates from the movement plane S and the state where it comes in contact with the movement plane S, depending on the upward/downward movement of the supporting member 73.

In this modified example, in the stand mode attitude state shown in FIG. 11A, the step portion 71 is tilted to a degree where a passenger's foot cannot be placed on the surface 71A, and the skid portion 72 is in contact with the movement plane S. In the mode switching attitude state shown in FIG. 11B, the step portion 71 changes the amount of tilting of the surface 71A, and the skid portion 72 changes the amount of separation from the movement plane S. In the step mode attitude state shown in FIG. 11C, the step portion 71 is in the state where the passenger's foot can be placed on the surface 71A, and the skid portion 72 is separated from the movement plane S by a predetermined distance.

Moreover, in the embodiment described above, in the ground separation process of FIG. 9 and the ground contact process of FIG. 10 respectively, the number of times until the final target tilt angle is reached are predetermined values respectively such as N1 times and N2 times. However, the number of times need not be preliminarily determined, and the amount of the target tilt angle of each time changed from the previous time may be taken as a predetermined value. Furthermore, the change amount of the target tilt angle may differ, depending on at which time it is. For example, a low-pass filter may be applied to the final target tilt angle, and it may be taken as the target tilt angle of the n-th time.

Moreover, a program for realizing the functions of the control device 106 in FIG. 8 may be recorded on a computer-readable recording medium, and the program recorded on this recording medium may be read into a computer system and executed, to thereby realize the control device 106. The "computer system" here includes an operating system and hardware such as peripheral devices.

Moreover, the "computer-readable recording medium" here refers to a movable medium such as a flexible disk, magnetic optical disk, ROM, and CD-ROM, or a memory device such as a hard disk, which is built into a computer system. Furthermore, the "computer-readable recording medium" includes one that dynamically retains the program for a short period of time such as a communication line when transmitting a program through a network such as the Internet or a communication line such as a telephone line, and one that retains the program for a certain period of time such as a volatile memory within a computer system serving as a server or client in the above case. The above program may realize part of the functions described above, and furthermore, it may realize the above functions in combination with a program that is already recorded on the computer system.

Moreover, each function block of the control device 106 in FIG. 8 described above may be individually made in a chip format, and it may be partly or entirely integrated in a chip format. Furthermore, the method of integrating into a circuit is not limited to LSI, and it may be realized by means of a dedicated circuit or a generic processor. The circuit may be of either a hybrid format or monolithic format. Also, the functions may be partly realized by means of hardware and partly by means of software.

Furthermore, if a circuit integration technique that replaces LSI emerges as semiconductor technology advances, an integrated circuit by means of this technique may be used.

What is claimed is:

1. An inverted pendulum control type moving body comprising:
    a first driving portion that moves a host moving body on a movement plane at least in a forward/backward direction;
    a supporting portion that supports the host moving body so that it stands independently in a state of being in contact with the ground;
    an operation portion that switches between the ground contact state and a ground separation state of the supporting portion; and
    a control portion that, when the operation portion switches the state of the supporting portion from the ground contact state to the ground separation state, controls operation of the first driving portion so that a forward/backward direction tilt angle of the host moving body approximates a target tilt angle in the ground separation state.

2. An inverted pendulum control type moving body comprising:
    a first driving portion that moves a host moving body on a movement plane at least in a forward/backward direction;
    a supporting portion that supports the host moving body so that it stands independently in a state of being in contact with the ground;
    an operation portion that switches between the ground contact state and a ground separation state of the supporting portion; and
    a control portion that, when the operation portion switches the state of the supporting portion from the ground separation state to the ground contact state, controls operation of the first driving portion so that a forward/backward direction tilt angle of the host moving body approximates a target tilt angle in the ground contact state.

3. The inverted pendulum control type moving body according to claim 1, wherein the supporting portion functions as a step on which a foot of a passenger of the host moving body is placed in the ground separation state.

4. The inverted pendulum control type moving body according to claim 1, wherein the operation portion is mechanically connected to the supporting portion.

5. The inverted pendulum control type moving body according to claim 3, wherein an angle with respect to a horizontal plane, of a plane of the step on which a foot is placed, is greater when the supporting portion is in the ground contact state than that when the supporting portion is in the ground separation state.

6. The inverted pendulum control type moving body according to claim 1, wherein the control portion controls the first driving portion so that the host moving body stands independently at a predetermined tilt angle, and when the operation portion switches the state of the supporting portion from the ground contact state to the ground separation state, it changes the predetermined tilt angle to a rear side compared to a tilt angle in a time when the host moving body is being supported by the supporting portion and standing independently.

7. The inverted pendulum control type moving body according to claim 2, wherein the control portion controls the first driving portion so that the host moving body stands independently at a predetermined tilt angle, and when the operation portion switches the state of the supporting portion from the ground separation state to the ground contact state, it changes the predetermined tilt angle so as to approach a tilt angle in a time when the host moving body is being supported by the supporting portion and standing independently, and lowers feedback gain at the time of controlling the first driving portion so that the host moving body stands independently at the predetermined tilt angle.

8. The inverted pendulum control type moving body according to claim 1, further comprising:
    a frame portion which rotatably supports the first driving portion;
    a second driving portion which is attached so as to be able to rotate about a rotation center of the first driving portion via a link portion;
    a first restriction portion which restricts rotation of the link portion in a first direction about the rotation center; and
    a second restriction portion which restricts rotation of the link portion in a second direction about the rotation center, wherein
    the operation portion operates: a first operation which brings the supporting portion into the ground separation state and which at the same time increases a clearance between the first restriction portion and the second restriction portion, and a second operation which brings the supporting portion into the ground contact state and which at the same time reduces the clearance between the first restriction portion and the second restriction portion.

9. The inverted pendulum control type moving body according to claim 2, wherein the supporting portion functions as a step on which a foot of a passenger of the host moving body is placed in the ground separation state.

10. The inverted pendulum control type moving body according to claim 9, wherein an angle with respect to a horizontal plane, of a plane of the step on which a foot is placed, is greater when the supporting portion is in the ground contact state than that when the supporting portion is in the ground separation state.

11. The inverted pendulum control type moving body according to claim 2, further comprising:
    a frame portion which rotatably supports the first driving portion;
    a second driving portion which is attached so as to be able to rotate about a rotation center of the first driving portion via a link portion;
    a first restriction portion which restricts rotation of the link portion in a first direction about the rotation center; and a second restriction portion which restricts rotation of the link portion in a second direction about the rotation center, wherein the operation portion operates: a first operation which brings the supporting portion into the ground separation state and which at the same time increases a clearance between the first restriction portion and the second restriction portion, and a second operation which brings the supporting portion into the ground contact state and which at the same time reduces the clearance between the first restriction portion and the second restriction portion.

* * * * *